United States Patent Office 3,095,350
Patented June 25, 1963

3,095,350
METHOD OF RENDERING SOIL NEMATOCIDAL WITH HALOGENATED SULFIDES
Robert W. Earhart, Overland Park, Paul C. Aichenegg, Prairie Village, and Jack Hensel, Leewood, Kans., assignors to Chemagro Corporation, New York, N.Y., a corporation of New York
No Drawing. Filed Mar. 27, 1961, Ser. No. 98,341
10 Claims. (Cl. 167—22)

The present invention relates to the control and eradication of nematodes.

Many chemicals employed as nematocides have been not only toxic to nematodes but also to plants which are intended to be protected from nematode attack. For this reason the application of various nematocides was made most generally from two weeks to six months before planting. This permitted the nematocide to kill the nematodes in the infested area and to dissipate into harmless nonphytotoxic residues.

It is an object of the present invention to develop a new method for reducing damage to the host plants by nematodes.

Another object is to develop a nematocide which has a high nematocidal activity and at the same time a very low degree of phytotoxicity.

A further object is to provide a nematocide which can be used to treat the soil and still permit the immediate utilization of the treated soil for crop purposes.

Still another object is to develop a nematocide which will permeate the soil at a greater distance from its point of application to enable root systems, subject to attack by nematodes, to be more fully protected.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by the preparation of compositions containing a compound having the formula

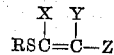

and applying it to soil. In the formula R is either a 1 to 8 carbon alkyl group or is benzyl. Two of X, Y and Z are either chlorine or bromine and the remaining member of X, Y and Z is hydrogen. The preferred compounds are alkyl thio 1,2-dichloroethylenes. Most preferably the alkyl group is an n-alkyl group having 3 to 5 carbon atoms.

The nematocides of the present invention are effective against saprophytic nematodes, e.g., of the genus Rhabditis and Panagrellus, root knob nematodes, e.g., of the genus Meloidogyne, etc. Unlike many nematocides such as DD (a mixture of 1,3-dichloropropylene and 1,2-dichloropropane) and Nemagon (1,2-dibromo-3-chloropropane containing 3% of other chlorinated and brominated $C_3$ compounds) the nematocides of the present invention are substantially nonphytotoxic.

The nematocides of the present invention can be made by reacting a trihaloethylene, preferably trichloroethylene, with an alkyl mercaptan or benzyl mercaptan or thiophenol in the presence of a base. A mixture of isomers containing principally the cis and trans 1,2-dihaloethenyl sulfides and small amounts of the 2,2-dihaloethenyl sulfides is formed by this procedure and the mixture can be used as such or separated into the individual isomers, e.g., by fractional distillation. Unless otherwise indicated, in the following examples there was used the naturally occurring mixture of the cis and trans isomers as formed by the reaction of the appropriate mercaptan with trichloroethylene. The alkyl or benzyl dihaloethenyl sulfides employed as nematocides in the instant invention can be prepared, for example, as set forth in Italian Patent 590,497. The Italian patent describes the preparation of such compounds in detail in Examples 1–4 and 6.

Examples of compounds which can be used as nematocides according to the present invention are 1,2-dichloroethenyl methyl sulfide; 1,2-dichloroethenyl ethyl sulfide; 1,2-dichloroethenyl n-propyl sulfide; 1,2-dichloroethenyl isopropyl sulfide; 1,2-dichloroethenyl n-butyl sulfide; 1,2-dichloroethenyl isobutyl sulfide; 1,2-dichloroethenyl-sec. butyl sulfide; 1,2-dichloroethenyl tert. butyl sulfide; 1,2-dichloroethenyl n-amyl sulfide; 1,2-dichloroethenyl n-hexyl sulfide; 1,2-dichloroethenyl n-heptyl sulfide; 1,2-dichloroethenyl n-octyl sulfide; 1,2-dichloroethenyl isooctyl sulfide; 1,2-dichloroethenyl 2-ethylheptyl sulfide; 1,2-dichloroethenyl benzyl sulfide; 1,2-dibromoethenyl n-butyl sulfide; 1,2-dibromoethenyl n-amyl sulfide; 1,2-dibromoethenyl n-propyl sulfide; 1 bromo-2-chloroethenyl n-butyl sulfide; 2,2-dichloroethenyl methyl sulfide; 2,2-dichloroethenyl n-propyl sulfide; 2,2-dichloroethenyl n-butyl sulfide; 2,2-dichloroethenyl n-amyl sulfide; 2,2-dichloroethenyl n-octyl sulfide; 2,2-dichloroethenyl isopropyl sulfide; 2,2-dichloroethenyl benzyl sulfide; 2,2-dibromoethenyl n-butyl sulfide; 2,2-dibromoethenyl n-amyl sulfide; 1 bromo-2-chloroethenyl n-amyl sulfide; 2,2-dibromoethenyl benzyl sulfide; 1,2-dichloroethenyl phenyl sulfide.

As previously set forth, the isolated cis and trans isomers of the 1,2-dihalo compounds can be employed but for convenience it has been found advantageous to employ the naturally formed mixture of such isomers.

Because the nematocides of the present invention are nonphytotoxic in amounts showing good nematocidal activity they can be employed in landscaping, greenhouses and seed beds where it is normally desirable to avoid waiting between applying the nematocide and planting the plant or seed. The present nematocides possess sufficient residual effectiveness as to be potent for reducing nematode injury even where a waiting period is employed.

The nematocidal compounds of the present invention can be added to the soil in solid formulations, e.g., dust formulations. In such cases there are usually added finely divided carriers as diluents. Typical examples of such carriers are talc, pyrophyllite Attaclay (attapulgite), kieselguhr, chalk, diatomaceous earth, lime, calcium carbonate, bentonite, fuller's earth, cotton seed hulls, wheat flour, soybean flour, pumice, tripoli, wood flour, walnut shell flour, lignin, rock phosphate sulfa, colloidal silica and precipitated calcium phosphate.

It also is frequently desirable to add surface active agents, e.g., in an amount of 0.05 to 10% by weight of the formulation. These materials can be anionic, cationic or nonionic and include conventional soaps, e.g., sodium stearates, water soluble salts of alkyl sulfonates, e.g., sodium tetradecane sulfonate, water soluble salts of alkyl sulfate, e.g., sodium lauryl sulfate, water soluble salts of alkylaryl sulfonates, e.g., sodium dodecylbenzene sulfonate, sodium butyl naphthalene sulfonate and sodium decyl benzene sulfonate, sulfonated animal, vegetable and mineral oils, alkylaryl polyether alcohols, e.g., nonylphenolethylene oxide condensate (having 10 ethylene oxide units) sodium lignin sulfonate, Aerosol OT (di-2-ethylhexyl) sodium sulfosuccinate, rosin soaps, tris polyoxyethylene sorbitan sesquioleate, sorbitan monolaurate, quaternary salts of high molecular weight acids, polyethylene esters of fatty acids and rosin acids, sodium abietate, polyethylene glycoldistearate, polyethylene oxide-polypropylene oxide condensate.

Frequently, it is desired to make formulations incorporating organic solvents such as hydrocarbons, ketones and chlorinated hydrocarbons, e.g., benzene, xylene, toluene, acetone, methyl ethyl ketone, kerosene, trichlorethylene, chlorobenzene, carbon tetrachloride, etc.

Aqueous dispersions also are frequently advantageous.

A typical dust or wettable powder formulation is as follows:

FORMULATION A

| | Parts |
|---|---|
| Active ingredient, e.g., dichloroethenyl methyl sulfide | 50 |
| Pluronic L61 (polyethylene oxide polypropylene oxide) | 2 |
| Sodium lignin sulfonate | 2 |
| Synthetic silica (Hi-Sil No. 233) | 46 |

To apply it to the soil 2 parts of this mixture are added to 18 parts of Attaclay. The resulting mixture will supply 10,000 parts of soil with 100 p.p.m. of active ingredient. By reducing the amount of Formulation A to 0.2 part and increasing the amount of Attaclay to 19.8 parts, the final mixture will supply to 10,000 parts of the soil 10 p.p.m. of active ingredient.

A suitable aqueous formulation is described below.

FORMULATION B

An emulsifiable spray concentrate containing 4 lbs. active ingredient per gallon is prepared by mixing the following:

| | |
|---|---|
| Active ingredient | 48 grams. |
| Emulsifier Atlas G 1256 (polyoxyethylene sorbitol esters of mixed fatty and resin acids) | 8 grams. |
| Xylene-type aromatic solvent (such as Espesol 5 or Amsco B-85) | Remainder to 100 ml. |

This concentrate is diluted with water to form an emulsion at the strength needed for suitable application.

The nematocides of the present invention can be applied to the soil at the rate of 2 to 400 pounds per acre for control of nematodes on field and vegetable crops. For ornamental plantings and orchard crops, including citrus, as pre- and post-planting applications they can be applied at 10 to 500 p.p.m. of the active chemical in the soil. In dip applications for disinfestation from 25 to 1000 p.p.m. of active chemical are used in the dipping suspension. The lower concentrations are normally used with the more nematocidally active members of the class of compounds set forth.

Example 1

1,2-dichloroethenyl methyl sulfide (a mixture of cis and trans isomers identified as C-1000) was screened against saprophytic nematodes (a mixture of Panagrellus and Rhabditis spp.) in a direct contact test by placing 75-100 nematodes in a vial containing an aqueous solution of C-1000. After a 48 hour incubation period, the nematodes were examined under the microscope and the percent kill observed.

| Rates: | Percent kill |
|---|---|
| 200 | 100 |
| 100 | 70 |
| 50 | 30 |
| Untreated control | 10 |

Example 2

In another test roots from tomato plants growing in heavily infested soil containing root knot nematodes (Meloidogyne incognita incognita) were treated with an aqueous mixture of C-1000. There was 100% kill at concentrations of C-1000 of 200 p.p.m. and 100 p.p.m.

Example 3

To determine relative phytotoxicity the following tests were performed. Roots of two-week old tomato plants (Bonny Best variety) were immersed in a 200 p.p.m. aqueous solution of the indicated compound for 24 hours after which the plants were then transferred to pots of soils. The plants treated with C-1000 as well as the untreated controls showed no evidence of phytotoxicity. Plants treated with DD and Nemagon (both commercial nematocides) showed phytotoxicity as evidenced by chlorosis and marginal burning.

Example 4

Soil from a root knot (Meloidogyne spp.) infested green house bed containing infected plant debris was treated with technical chemical and wettable powder formulations of C-1000 (1,2-dichloroethenyl methyl sulfide) at 200 p.p.m. Three-week old tomato seedlings were transplanted to pots containing treated soil seven days after treating. These were held in the greenhouse at about 80° F. Five weeks after setting, the tomato plants were uprooted and rated for degree of root knot injury based on a 0–10 scale, where "10"=no visible injury and "0"=severe injury as manifested by numerous large knots, and none, or only a very few active feeder roots. The control plants growing in untreated soil all were rated "0." The plants growing in the soil treated with C-1000 wettable powder were rated an "8" and the plants growing in soil treated with C-1000 technical were rated "10."

Example 5

Emulsifiable concentrates of C-1000 were injected into soil naturally infested with the root knot nematode (Meloidogyne spp.) at from 4 gallons to 32 gallons of actual chemical per acre. Two weeks after applying the chemical, tomato seedlings (Glamor variety) and cucumber seeds (Marketer variety) were set or planted. Nine weeks after the test plants were started they were uprooted and compared with plants growing on untreated control plots for the amount of root knot injury. The root knot ratings were based on a 0–10 scale where "0"=no reduction in root knotting indicating no effect on the nematode and "10"=complete reduction in root knotting or complete inhibition of nematode action. The results were as follows:

| Gal./acre | 4 | 8 | 16 | 32 |
|---|---|---|---|---|
| Root knot rating | 3 | 6 | 9 | 8 |

These rates of application were equivalent to 40 to 320 pounds of active chemical per acre.

Example 6

Formulation A was used to test various 1,2-dichloroethenyl alkyl or aralkyl sulfides as nematocides for killing saprophytic nematodes (Panagrellus and Rhabditis spp.) in a direct contact test as described earlier with Formulation A. 40 mg. of Formulation A was diluted with 100 ml. of water to give a suspension with a concentration of 200 p.p.m. of the compound; subsequent dilutions of the resulting suspension were made to secure concentrations of 100, 50, 25, and 12.5 p.p.m. The results obtained are set forth in tabular form. The compounds all had the formula $RSCCl=CHCl$ wherein the significance of R is explained in the table. The figures for each concentration are the percent kill of the nematodes:

| R | 200 p.p.m. | 100 p.p.m. | 50 p.p.m. | 25 p.p.m. | 12.5 p.p.m. |
|---|---|---|---|---|---|
| methyl | 90 | 30 | 10 | 10 | 10 |
| ethyl | 100 | 100 | 50 | 10 | 10 |
| n-propyl | 100 | 100 | 100 | 90 | 30 |
| isopropyl | 100 | 60 | 20 | 10 | 10 |
| n-butyl | 100 | 100 | 100 | 100 | 80 |
| isobutyl | 100 | 100 | 100 | 80 | 50 |
| sec. butyl | 80 | 60 | 30 | 10 | 10 |
| n-amyl | 100 | 100 | 100 | 100 | 90 |
| n-heptyl | 90 | 60 | 50 | 30 | 30 |
| n-octyl | 40 | 20 | 5 | 5 | 5 |
| benzyl | 100 | 100 | 100 | 100 | 80 |
| phenyl | 90 | 70 | 50 | 10 | 5 |

*Example 7*

Formulation A, of the desired compound from those listed in Example 6, is used to make a 3.2% suspension by adding 640 mg. of the formulation to 10 ml. of water; diluting the resulting suspension 1:100 with water to prepare a standard stock concentration. A 200 p.p.m. concentration of the active ingredient is secured by adding 2.2 ml. of the stock suspension to 1.3 ml. of soil containing *Meloidogyne incognita incognita* infested tomato root tissue. To secure a 100 p.p.m. concentration, 1.1 ml. of the stock is added to 2.4 ml. of the soil root mixture; 50 p.p.m. concentration is obtained by adding 0.5 ml. of stock to 2.9 ml. of soil-root mixture. The lower concentrations of active ingredient are obtained in a similar manner. The compounds employed all had the formula RSCCl=CHCl wherein the significance of R is explained in the table. The figures for each concentration are the percent kill of the nematodes:

| R | 200 p.p.m. | 100 p.p.m. | 50 p.p.m. | 25 p.p.m. | 12.5 p.p.m. |
|---|---|---|---|---|---|
| methyl | 100 | 100 | 10 | 10 | 10 |
| n-propyl | 100 | 100 | 100 | 40 | 10 |
| n-butyl | 100 | 100 | 100 | 80 | 80 |
| isobutyl | 100 | 100 | 100 | 100 | 100 |
| sec. butyl | 100 | 100 | 100 | 50 | 10 |
| n-amyl | 100 | 100 | 100 | 60 | 10 |
| 2-ethyl hexyl | 70 | 30 | 10 | 10 | 10 |
| benzyl | 100 | 100 | 100 | 80 | 80 |

We claim:
1. A method of rendering soil nematocidal comprising introducing into the soil a nematocidal amount of a compound having the formula

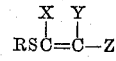

where R is selected from the group consisting of a 1 to 8 carbon atom alkyl and benzyl, two of X, Y and Z being a halogen having an atomic weight between 35 and 80 and the remaining member of X, Y and Z being hydrogen.

2. A method according to claim 1 wherein two of X, Y and Z are chlorine and the remaining member of X, Y and Z is hydrogen.

3. A method of rendering soil nematocidal comprising introducing into the soil a nematocidal amount of a 1 to 8 carbon atom alkyl 1,2-dichloroethenyl sulfide.

4. A method of rendering soil nematocidal comprising introducing into the soil a nematocidal amount of a 2 to 5 carbon atom alkyl 1,2-dichloroethenyl sulfide.

5. A method according to claim 4 wherein the alkyl group is an n-alkyl group.

6. A method according to claim 4 wherein the alkyl group is n-butyl.

7. A method according to claim 4 wherein the alkyl group is n-amyl.

8. A method according to claim 4 wherein the alkyl group is n-propyl.

9. A method according to claim 4 wherein the alkyl group is isobutyl.

10. A method of rendering soil nematocidal comprising introducing into the soil a nematocidal amount of benzyl 1,2-dichloroethenyl sulfide.

References Cited in the file of this patent

UNITED STATES PATENTS

| 2,701,224 | Stansbury et al. | Feb. 1, 1955 |
| 2,894,991 | Barr et al. | July 14, 1959 |
| 3,039,918 | Hambsch et al. | June 19, 1962 |

FOREIGN PATENTS

| 1,032,967 | Germany | June 26, 1958 |